March 12, 1963 W. F. WILLBOND 3,080,563
FASTENER FORMING AND INSERTING MACHINES
Filed Oct. 9, 1961 7 Sheets-Sheet 1

Inventor
William F Willbond
By his Attorney
Vincent A. White

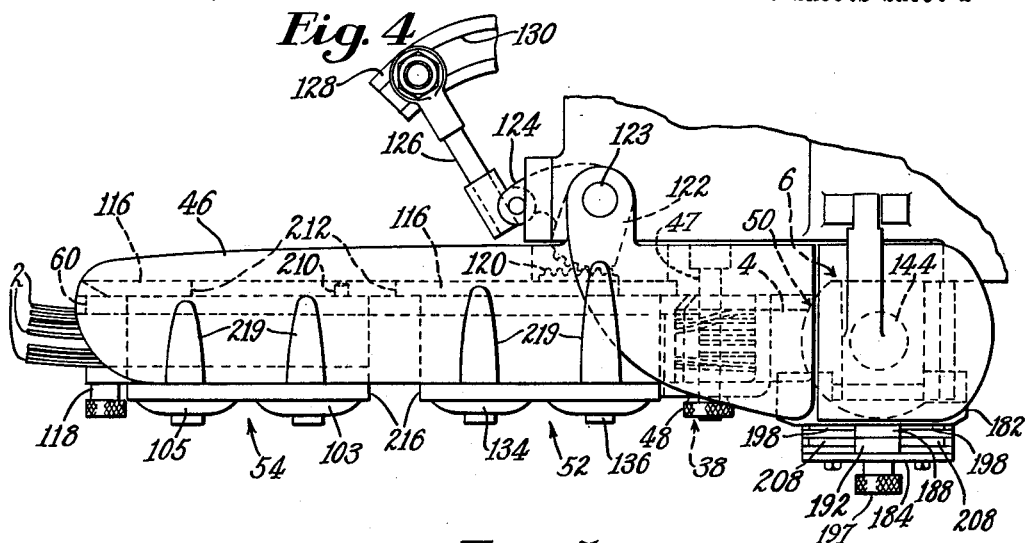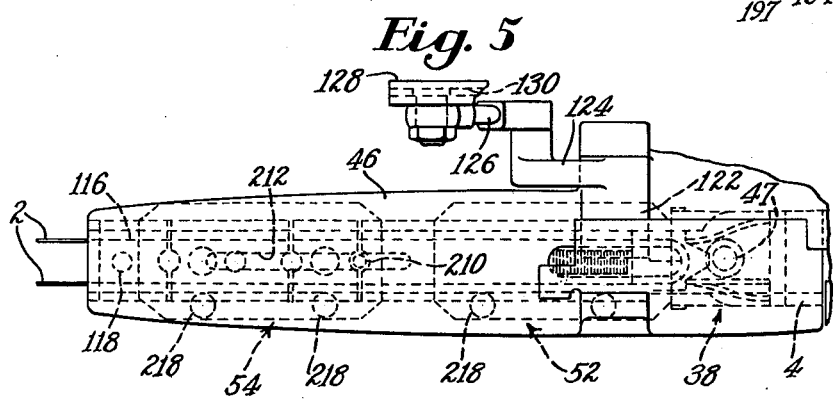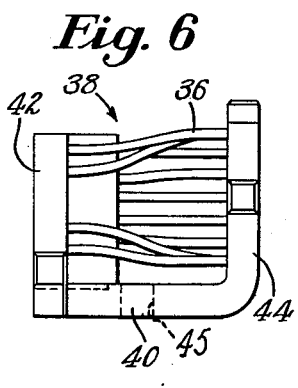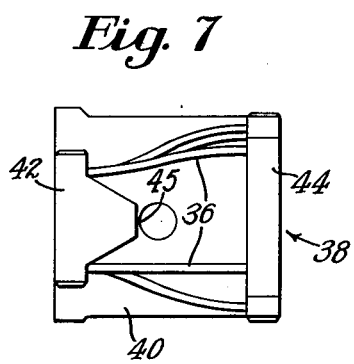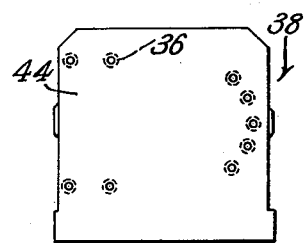

March 12, 1963   W. F. WILLBOND   3,080,563
FASTENER FORMING AND INSERTING MACHINES
Filed Oct. 9, 1961   7 Sheets-Sheet 3
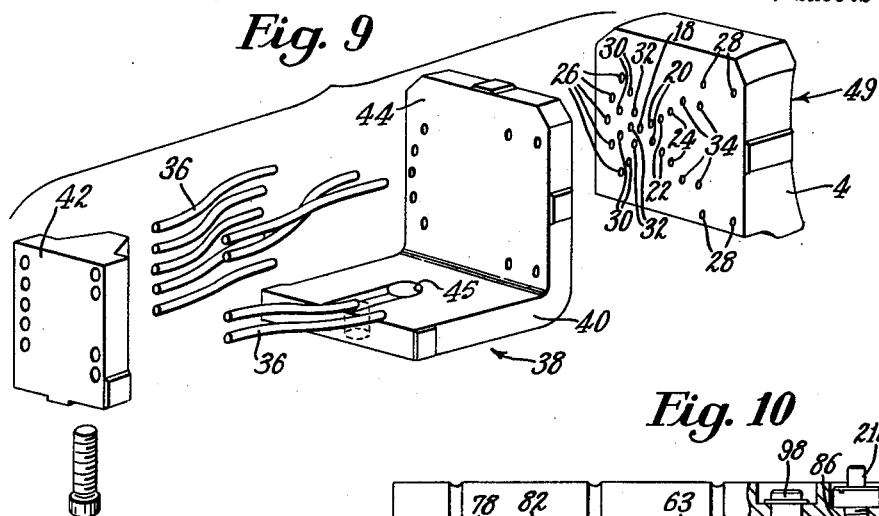
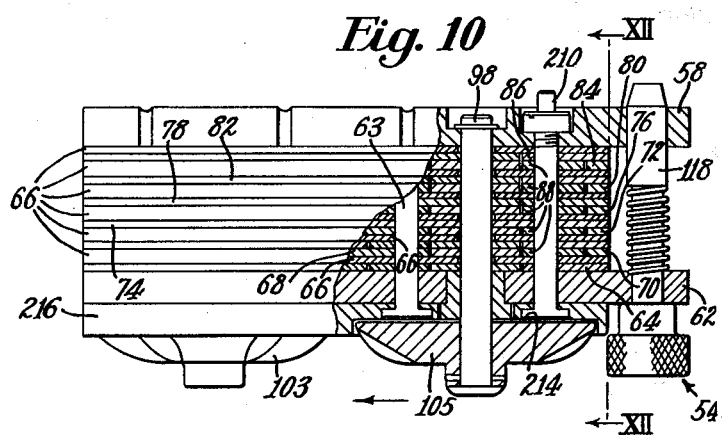
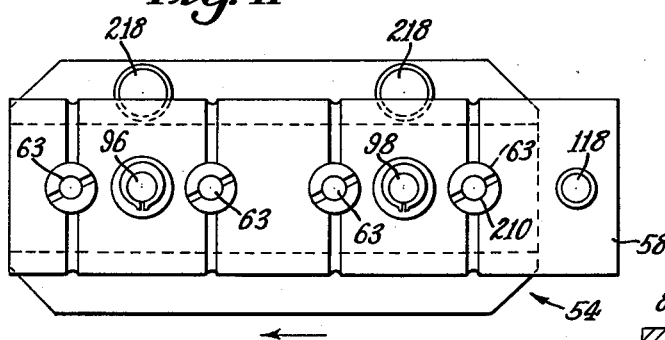
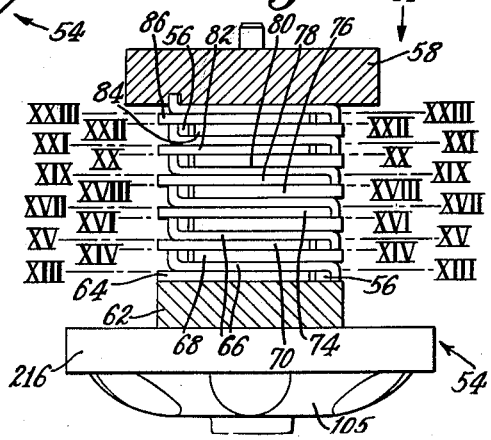

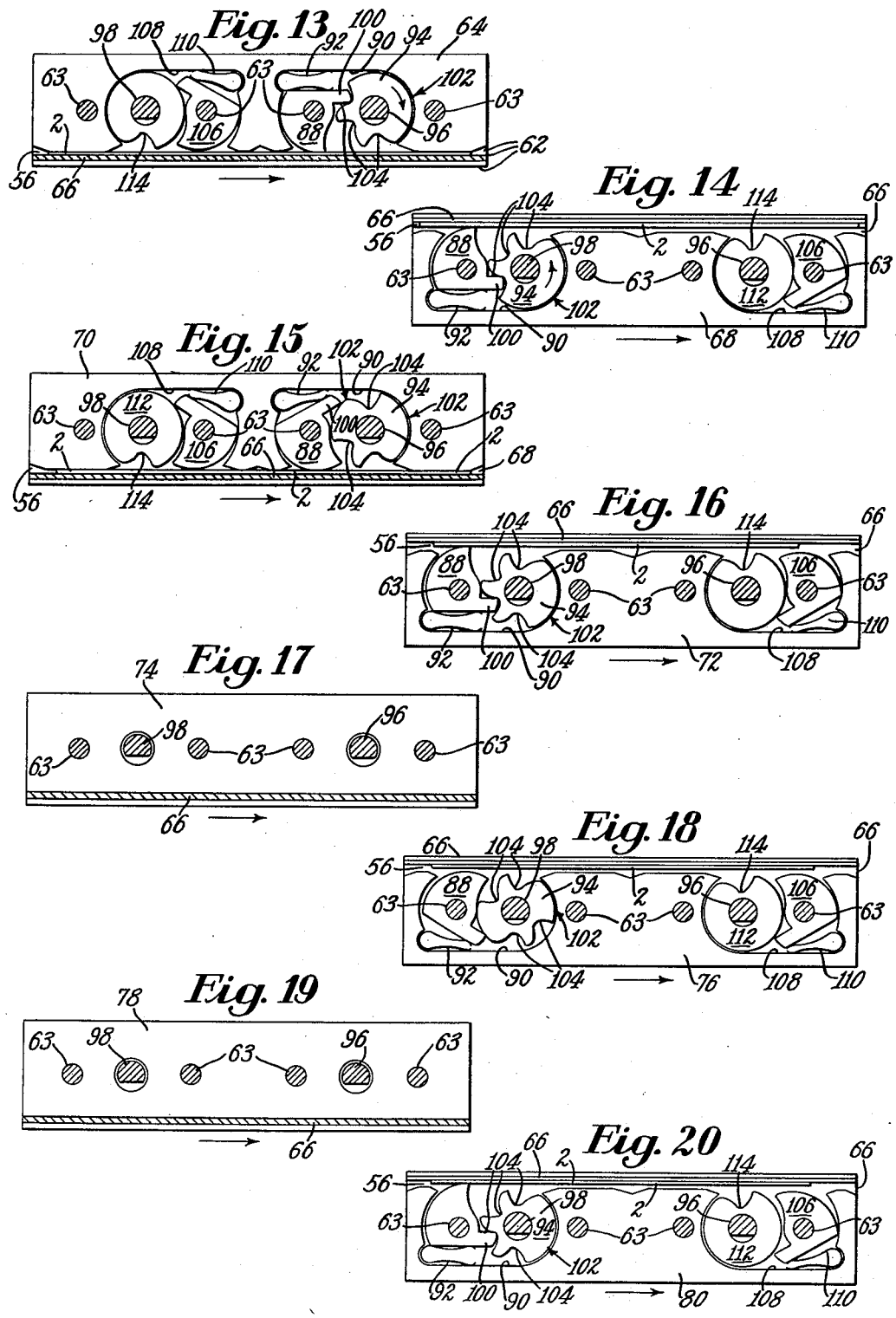

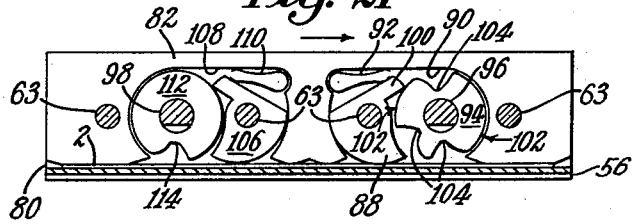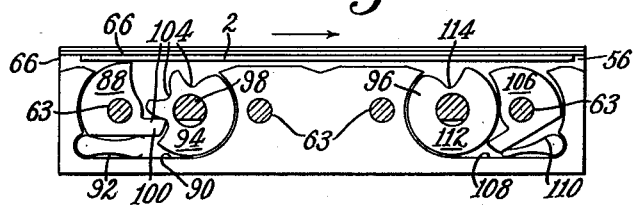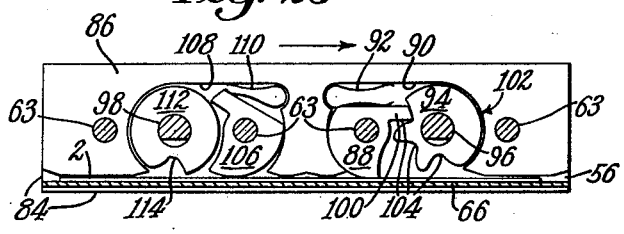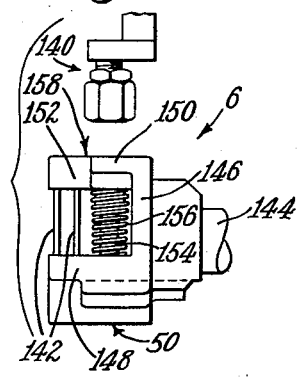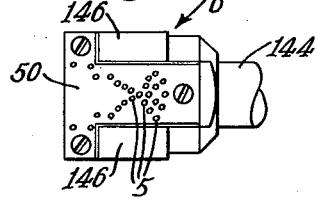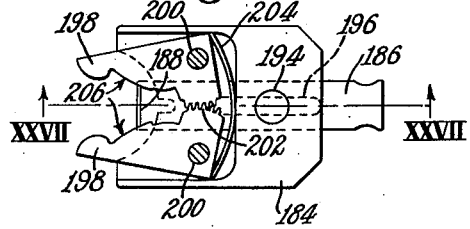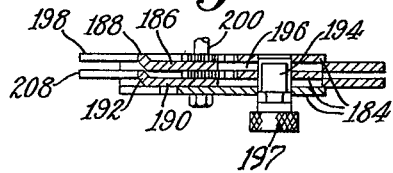

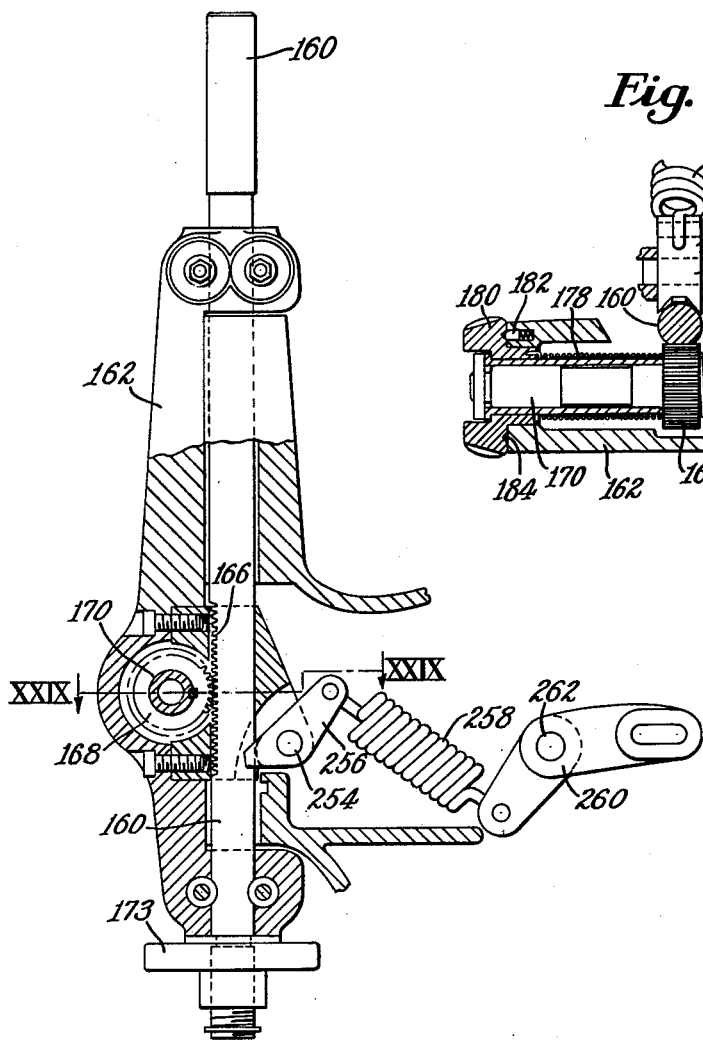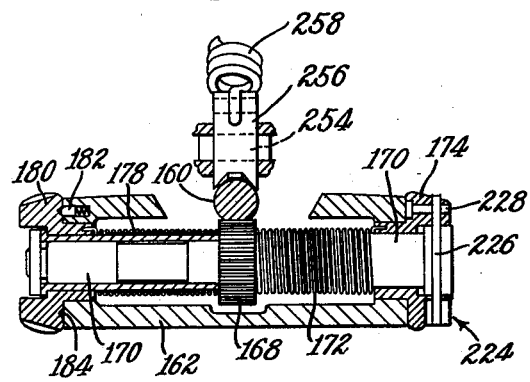

March 12, 1963    W. F. WILLBOND    3,080,563
FASTENER FORMING AND INSERTING MACHINES
Filed Oct. 9, 1961    7 Sheets-Sheet 7
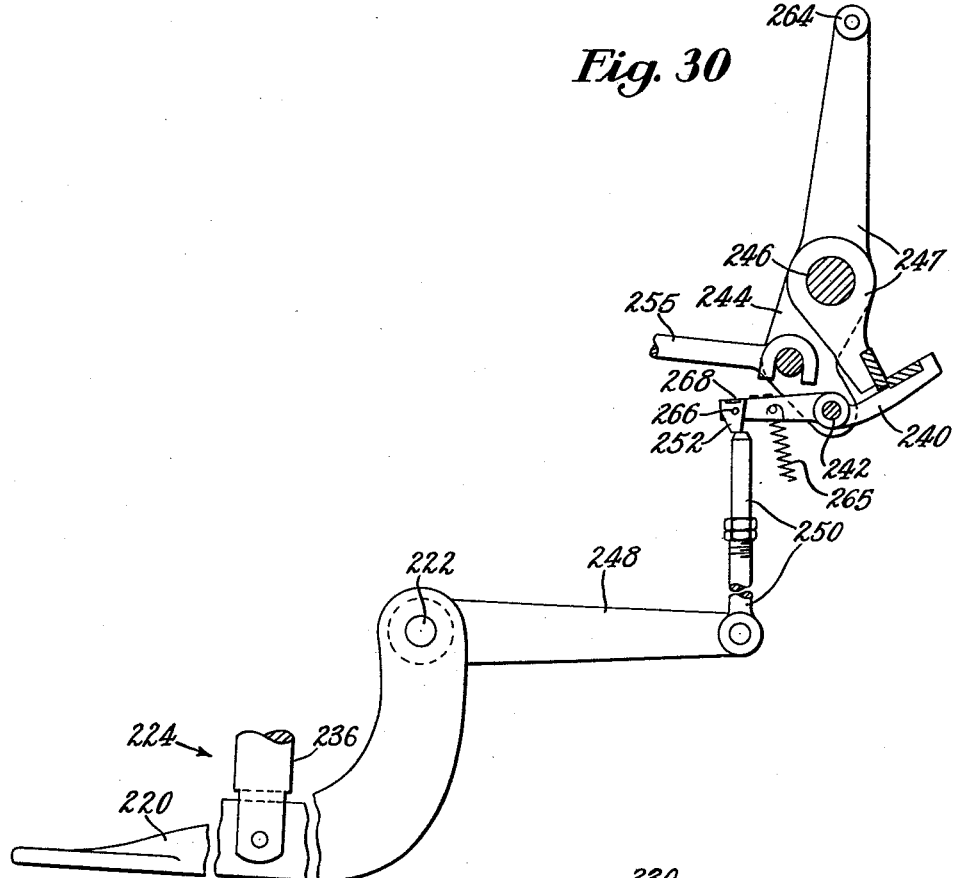
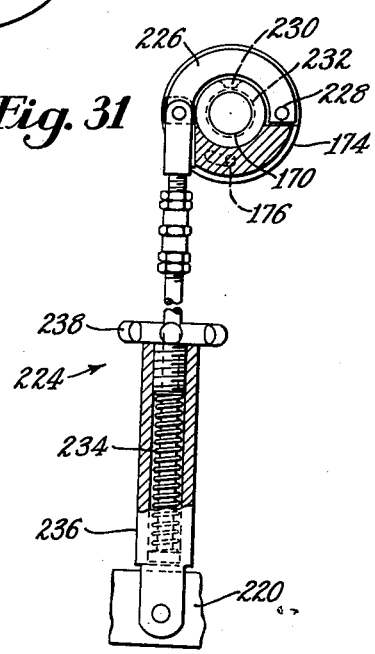

United States Patent Office 3,080,563
Patented Mar. 12, 1963

3,080,563
FASTENER FORMING AND INSERTING MACHINES
William Frank Willbond, Leicester, England, assignor to United Shoe Machinery Corporation, Flemington, N.J., a corporation of New Jersey
Filed Oct. 9, 1961, Ser. No. 143,660
Claims priority, application Great Britain Oct. 15, 1960
19 Claims. (Cl. 1—27)

This invention relates generally to fastener forming and inserting machines. More particularly the invention is directed to a machine for attaching top lifts to shoe heels with a plurality of fasteners.

It is often desirable in the attaching of one work piece to another, for example a top lift to a shoe heel, to insert a plurality of fasteners into the work in accordance with a pre-arranged pattern. There are presently available fastener inserting machines suitable for use in attaching top lifts to heels by means of a plurality of wire pins, often referred to as "slugs." Such machines generally have means for simultaneously cutting off a plurality of slugs from wires, and have a plurality of drivers for thereafter driving the slugs simultaneously through a top lift and into a heel. Machines of this type have proved generally satisfactory in attaching the comparatively small top lifts required on slender heels which usually require only a few slugs effective to secure a top lift thereto.

Machines of this type are provided with a fixed shearing die having several passages through each of which a wire is fed into a corresponding throat in a rotary slug shearing and transferring device. This device shears slugs from the wires and transfers them to positions in which they may be driven into the work by means of a driver bar having several drivers arranged in formation and spacing corresponding to the formation and spacing of the throats in the slug shearing and transferring device. Should somewhat larger top lifts and heels be operated upon it is desired that the slugs be spaced further apart and in order to accomplish this the fixed shearing die, the rotary slug shearing and transferring device, and the driver carrier have to be changed accordingly. Should comparatively large top lifts and heels be operated on, more slugs are required effectively to secure the top lifts to the heels and it has been a usual practice to insert them singly. The reason for this is that it has been difficult for an operator, in threading wires into the machine, to thread more than three wires into a fixed shearing die. Furthermore, the wires tend to become buckled, during feeding movement of the machine, between the feed wheel with which such machines are equipped and the fixed shearing die, resulting in the wires fouling each other and not being fed by equal amounts.

Accordingly, it is one of the various objects of the present invention to provide an improved fastener forming and inserting machine having particularly simple and convenient means for selecting any number and/or combination of wires, from a total number of wires fed into the machine from separate wire supplies, to provide fasteners which may be inserted in accordance with any chosen one of a variety of patterns and/or spacings to suit a wide range of shapes and sizes of work pieces which may be operated on the machine.

With this object particularly in mind the invention provides an interchangeable wire guiding device for directing the wires fed according to selected patterns to mechanism for cutting off fasteners from the wires. The cutting off mechanism includes a stationary shearing die having a selection of passages into which the wires are guided to determine the pattern and/or spacing of the fasteners when driven into the work. In accordance with one feature, the feeding means comprises means for gripping a selected number of wires for feeding as controlled by an operator-settable selector mechanism which determines the number and/or combination of wires so to be fed. The feeding means comprises a reciprocable block adapted to guide a wire from each wire supply towards a rotary slug shearing and transferring device. In the illustrative machine the wires are fed at an appropriate time in an operative cycle of the machine by being selectively gripped in said block which moves in a direction to feed end portions of the wires into throats in the rotary slug shearing and transferring device. Each wire in the reciprocable block is gripped by a pawl which is movable out of engagement with its associated wire by a cam. The cams are settable by operator controlled means so that the operator may select which combination of the wires in the reciprocable block are engaged by their respective pawls for feeding purposes. Thus at the will of an operator all or only some of the wires may be fed to provide slugs during an operative cycle of the machine.

In the illustrative machine all the wires fed are guided through an interchangeable wire guiding device to the fixed shearing die. The fixed shearing die has a multiplicity of passages (more than the total number of wires) through any of which the wires may be fed into throats in the slug shearing and transferring device. The slug shearing and transferring device has the same number and arrangement of throats as there are passages in the fixed shearing die. The passages and throats are so arranged as to cover all the slug patterns, in spacing and formation, which are likely to be required within the range of work for which the illustrative machine is intended to be used. The machine is provided with several interchangeable wire guiding devices, the appropriate one of which may be selected by the operator and fitted into the machine to accommodate the work being operated on. Each wire guiding device has a guide tube for each one of the total number of wires which may be fed by the reciprocable block. Thus, each guiding device may guide all the wires to a different selection of passages in the fixed shearing die. As has been said, only certain of the wires may be selected for feeding so that some variations of slug patterns or spacings may be provided without the need to change the guiding device in the machine.

The construction of the machine is such that, for the work with which the machine is intended to be used, all the likely variations of slug patterns are obtainable with the use of a minimum number of wire guiding devices. For changing a wire guiding device in the illustrative machine all the wires may be gripped in the reciprocable block in such a manner that the machine operator may move the reciprocable block in a direction to withdraw all the wires simultaneously from the tubes in the wire guiding device. Having replaced said device with another the operator may return the reciprocable block to its initial position, the wires being moved simultaneously through the tubes in the wire guiding device placed in the machine and through those passages in the fixed shearing die which register with that device to take up positions with ends of the wires in alignment with a shear face of the fixed shearing die.

According to another feature of the invention, work to be operated on is supported on a post, spring balanced in a manner to support the work at a convenient height and reduce operator fatigue by taking the weight of the work as it is positioned in the machine. The construction is such that the spring loading may be adjusted to suit different conditions of work. After initial positioning, the work is clamped positively against a work plate on depression of a treadle to trip the machine. This ensures the top lift being compacted against the heel being operated on and minimizes any tendency for the work to separate or move position when the slugs are driven. The positive clamping pressure is adjustable by means of a spring yield thereby making provision for delicate work, such as slender heels which could be crushed or broken with excessive pressure. During the operation of the machine the work is automatically locked against yielding while the slugs are driven.

The arrangement of the illustrative machine is such that the top lift and heel locating means provided in the machine have setting indications which together with setting indications on the wire guiding devices and various wire gripping controls may be so co-ordinated as to make it possible to provide all the machine setting information on a chart which pertains to every style of shoe heel to be operated on in the machine. Thus, the machine may be adjusted for different types of work with a minimum delay.

The above and other features of the invention including various novel details of construction and combinations of parts will now be more particularly described with reference to the accompanying drawings and pointed out in the claims. It is to be clearly understood, however, that the illustrative machine is selected for description merely by way of exemplification of the invention and not by way of limitation thereof.

In the drawings,

FIG. 4 is a front view of a portion of the machine shown in FIG. 1 on a larger scale;

FIG. 5 is a plan view of mechanism shown in FIG. 4;

FIG. 6 is a view in elevation of an interchangeable wire guiding device associated with the illustrative machine;

FIG. 7 is a plan view of the device shown in FIG. 6;

FIG. 8 is a view of the right-hand side of the device shown in FIG. 6;

FIG. 9 is an exploded view of the device shown in FIG. 6 together with a fixed shearing die of the illustrative machine;

FIG. 10 is a rear view, partly in section, of mechanism for gripping and feeding wires to form slugs in the illustrative machine;

FIG. 11 is a plan view of mechanism shown in FIG. 10;

FIG. 12 is a sectional view taken on the line XII—XII in FIG. 10;

FIGS. 13-23 are sections, viewed in the direction of the arrow A in FIG. 12, taken respectively on the lines XIII—XIII to XXIII—XXIII in FIG. 12;

FIG. 24 is a side view of a rotary slug shearing and transferring device of the illustrative machine;

FIG. 25 is an inverted plan view of the device shown in FIG. 24;

FIG. 26 is a plan view of work locating means of the illustrative machine;

FIG. 27 is a section taken on the line XXVII—XXVII in FIG. 26;

FIG. 28 is a right-hand side view, partly in section, of work supporting and clamping mechanism of the illustrative machine;

FIG. 29 is a section taken mainly on the line XXIX—XXIX in FIG. 28;

FIG. 30 is a side view of a treadle mechanism of the illustrative machine and connections therewith; and FIG. 31 shows, partly in section, connections between the work supporting and clamping mechanism and the treadle.

Figure 1:
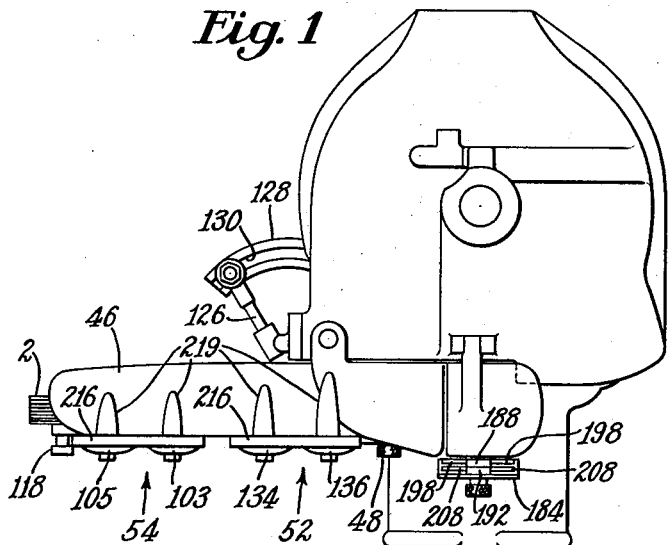
FIG. 1 is a front view of the illustrative machine.

The illustrative machine has means for feeding simultaneously a plurality of wires 2 (FIGS. 1, 4 and 5) from separate coils of wire (not shown) to provide a plurality of fasteners commonly referred to as "slugs." The slugs are sheared from the wires so fed by cutting off mechanism during an operative cycle of the machine. Since nine slugs are the maximum usually called for in attaching top lifts within the range of work for which the machine is intended to be used, the feeding means is designed to feed nine wires.

Figure 2:
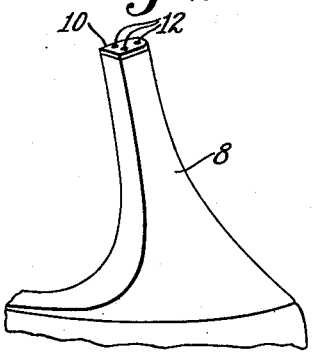
FIG. 2 shows one style of heel to which a top lift may be attached by the machine.
Figure 3:
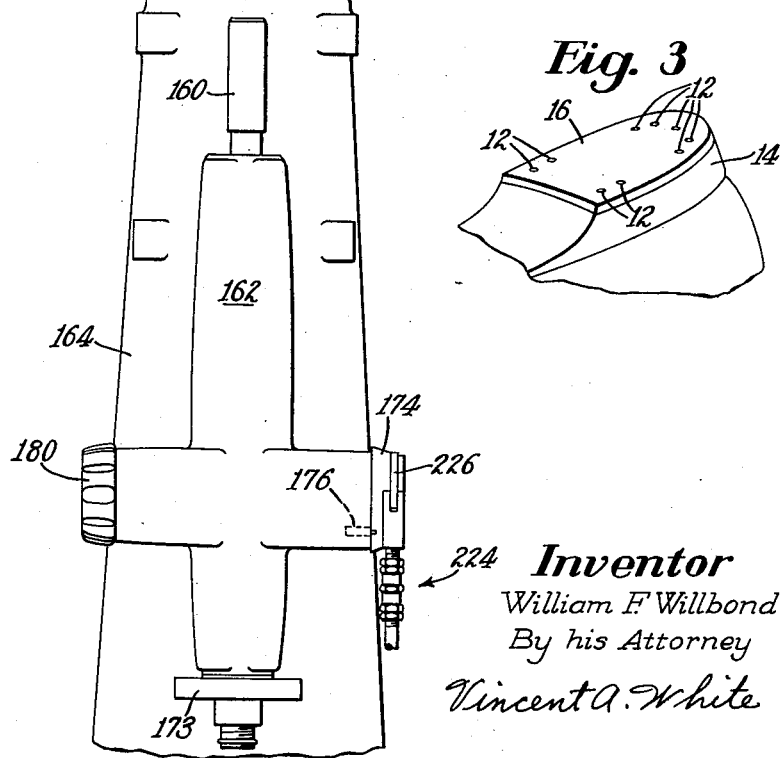
FIG. 3 shows another heel style of larger size which also may have a top lift attached by the machine.

The feeding mechanism is provided with operator-settable selector mechanism, hereinafter described, whereby an operator may determine the number and/or combination of wires to be fed to provide slugs. The construction is such that an operator may easily select from three to nine wires, according to the work to be operated on for feeding through a selection of passages in a stationary shearing die 4 (FIGS. 4, 5 and 9) of the cutting off mechanism. The wires fed through the passages enter aligned throats 5 (FIG. 25) in a rotary slug shearing and transferring device 6 (FIGS. 4, 24 and 25) which upon rotation shears slugs from the ends of the wires projecting from the stationary shearing die 4 and transfers them into positions in which they may be driven into work in the machine. There are twenty-seven passages in the die 4 which are of just sufficient diameter to admit a wire and are so arranged in spacing and formation as to cover all the likely requirements of the number of slugs, spacings and pattern formations suitable for the range of work for which the machine is intended to be used. FIG. 2 shows a slender heel 8 having a relatively small top lift 10 attached to the heel by a triangular formation of three slugs 12 while FIG. 3 shows a heel 14 of different style having a relatively large top lift 16 attached by a formation comprising five slugs 12 radially disposed around the back curve of the top lift and two slugs in each breast corner region of the top lift. FIG. 9 shows the disposition of the passages in the stationary shearing die 4.

In order to attach the top lift 10 (FIG. 2) in the manner shown, the operator may select three wires to be fed through passages 18 and 20, 18 and 22 or 18 and 24. The wire fed through the passage 18 provides the slug for attaching the top lift 10 adjacent the back curve of the top lift and the wires fed through the passages 20 or 22 or 24 provide the slugs for attaching the top lift 10 in the breast corner regions. The positions of the passages 20, 22 and 24 relatively to the passage 18 are arranged to cater for the range of sizes of top lifts most likely to be attached by a triangular formation of three slugs. In order to attach the top lift 16 (FIG. 3) in the manner shown, the operator may select nine wires to be fed through passages 26 and 28, the wires fed through the passages 26, which are radially disposed about the passage 18, providing the slugs for attaching the top lift 16 adjacent the back curve of the top lift and the wires fed through the passages 28 providing the slugs for attaching the top lift 16 in the breast corner regions. The construction and arrangement of the machine is such that wires fed through the passage 18 and passages 26, 30 and 32 radially disposed thereabout provide slugs for attaching top lifts to heels in the back curve regions of the top lifts, the wires fed through passages 20, 22, 24, 28 and 34 providing slugs for attaching top lifts to heels in the breast corner regions thereof.

The wires selected by the operator for feeding through the stationary shearing die 4 are directed through tubes 36 (FIGS. 6-9) of the appropriate one of a selection of interchangeable wire guiding devices 38 and into the chosen passages in the die 4 to determine the pattern and/or spacing of the fasteners when driven into the work in the machine. The illustrative machine is provided with four such devices, one of which is shown in FIGS. 6-9, to cater for the range of work for which said machine is intended to be used. The guiding device shown comprises two end plates 44 and 42, the end plate 42 being spaced apart from the end plate 44 on a base portion 40. The end plate 42 is bored to receive the wires fed by wire feeding mechanism of the machine, the opposite end plate 44 being bored with a formation of passages which align with appropriate passages in the die 4 when the guiding device is positioned in the machine. Wires fed during an operative cycle of the machine pass through the bores in the plate 42 and are guided by the tubes 36 through the passages in the end plate 44 and aligned passages in the die 4. The device 38 shown in FIG. 8 would be used for attaching the top lift 16 shown in FIG. 3, the tubes 36 leading to passages in the end plate 44 which align with the passages 26 and 28 in the stationary shearing die 4. To cover the range of slug patterns in popular use on work for which the machine is intended, each of the other wire guiding devices which may be used is equipped with nine tubes 36 for guiding up to the maximum number of wires to a selection of passages in the die 4. For example, the wire guiding device (not shown) which may be used in providing a triangular pattern of three slugs has nine guide tubes 36 leading to passages in its associated end plate 44 which may align with the passages 18, 20, 22, 24 and two convenient passages of the passages 34. Each guiding device is clearly marked so that by reference to a chart with which the operator may be provided, the device required for a given slug pattern or top lift size may be quickly determined. However, it will be understood that a variety of top life sizes and slug patterns may be utilized without the necessity of changing the wire guiding device. The wire guiding device 38 used is supported between the wire feeding mechanism hereinafter described and the stationary shearing die 4 in a bracket 46 (FIG. 4), the plate 44 of the device abutting the die 4 so that wires fed through the passages in the plate 44 may pass through the aligned passages in the die. So as to be readily replaceable the wire guiding device is supported on a heightwise extending stud 47 in the bracket 46, the stud passing through a bore 45 in the base portion 40 of the device and having a thumb nut 48 on its lower end for securing the guiding device in position. By unscrewing the nut 48 the guiding device may be easily withdrawn and replaced with another if required.

The means for feeding the wires 2 includes a fixed wire guide block 52 (FIGS. 1, 4 and 5) and a reciprocable wire guide block 54. These guide blocks are supported in the bracket 46 and comprise assemblies which provide guide tunnels 56 (FIGS. 12–23) one for each of the nine wires which may be fed into the machine. The blocks 52 and 54 are similar in construction except as will be hereinafter described and are supported by the bracket 46 so that the tunnels in the block 52 are in alignment with the tunnels in the block 54. The wires 2 extend from the wire supplies (not shown) along the tunnels 56, the block 54 incorporating means for gripping the wires which may be readily set by the operator to grip the wires selected for feeding and the block 52 incorporating mechanism which may be readily set by the operator to grip those wires not required to be fed. When the machine is tripped, the selected wires are fed by rectilinear movement of the block 54, the initial stroke of the block 54 being in a direction towards the block 52 thereby feeding the wires gripped in the block 54 through the block 52, the wire guiding device 38 the stationary shearing die 4 and into the aligned throats 5 in the shearing and transferring device 6. It will be understood that the bores for receiving the wires in the end plate 42 of the guiding device 38 are positioned to align with the tunnels 56 in the block 52. Any tendency for movement of the non-selected wires when the block 54 is moved towards the block 52 or on its return stroke, is prevented by their being gripped in the block 52.

Since the blocks 52 and 54 comprise similar assemblies, only the reciprocable block 54 will now be described in detail. The block 54 includes a carrier plate 58 (FIGS. 10–12) slidably mounted in a slideway 60 (FIGS. 4 and 5) in the bracket 46. Sandwiched between the carrier plate 58 and a base plate 62 are a stacked series of plates all of which are clamped together by means of four bolts 63. Referring particularly to FIGS. 12 and 13, resting on the base plate 62, is a relatively thin plate 64 somewhat less in width than the base plate 62. Surmounting the plate 64 is a plate 66 (FIGS. 12, 13, 14) having a downturned side edge extending towards the base plate 62. This down-turned edge of the plate 66 and a stepped-in side edge of the plate 64 provide opposite side walls of a rectangular gap enclosed by the plates 62, 64 and 66. This gap extends along the forward side of the block 54 and constitutes one of the aforementioned tunnels 56 in the block 54. The opposite side edge of the plate 66 is upturned to provide one wall of another tunnel 56 extending along the rearward side of the block 54. A plate 68 (FIGS. 12 and 14) similar to the plate 64, surmounts the plate 66 and is mounted so that a side edge thereof provides the wall, opposite the wall provided by the upturned edge of the plate 66, of the tunnel 56 last referred to. A plate 70 supported on the plate 68 and surmounted by another plate 66 provides a third tunnel 56 immediately above the first mentioned and lowest tunnel 56. Stacked on the plates just referred to are four other plates 66, having upturned and oppositely disposed downturned side edges, respectively separated from the upper one of the pair of plates 66 previously referred to and from each other by plates 72, 74, 76, 78, 80, 82, 84 and 86. The upturned side edge of the topmost plate 66 engages in a recess in the carrier plate 58. By an examination of FIGS. 12 and 13–23 it will be seen that the stacked plates are positioned relatively to each other to provide five tunnels 56, disposed heightwise relatively to each other, extending along the rearward side of the block 54 and four tunnels, disposed heightwise relatively to each other, extending along the forward side of the block 54. The plates 72, 76, 80, 82, 84 and 86 are similar to the plates 64, 68 and 70, each having a side edge which provides one side wall of an associated tunnel 56. The plates 74 and 78, while being of a similar thickness to the last mentioned plates, are somewhat wider and do not provide tunnel walls, their positions in the stack spacing the upper pair of tunnels 56 extending along the forward side of the block 54 a greater distance from the lower pair of tunnels 56 extending along the forward side of the block than the other tunnel spacings. The positions of the tunnels 56 relatively to the passages in the stationary shearing die 4 are such as to reduce to a minimum the amount of deviation from the direction of feed in guiding the wires to selected passages. The construction and arrangement of the illustrative machine is such that the wires 2 contained in the tunnels at the rearward side of the block 54 provide the slugs adapted to be driven in the back curve portion of a top lift, the wires 2 contained in the tunnels at the forward side of the block 54 providing the slugs adapted to be driven in the breast corner regions of a top lift. In certain slug patterns, wires contained in the rearward tunnels may be guided to form slugs other than those for driving in the back curve portion of a top lift.

For gripping those wires 2 selected to be fed to the shearing and transferring device 6, there is provided a series of grippers in the form of pawls 88 (FIGS. 10 and 13–23), one associated with each tunnel 56. Those pawls 88 associated with the tunnels 56 extending along the forward side of the block 54 are mounted for rotation on a bearing portion of an inner one of the aforementioned bolts 63, those pawls 88 associated with the tunnels 56 extending along the rearward side of the block 54 being mounted for rotation on a bearing portion on an outer one of the bolts 63. The pawls 88 are spaced apart along their respective bearing bolts 63, there being a pawl 88 contained in an opening 90 in each of the plates 64, 68, 70, 72, 76, 80, 82, 84 and 86. The pawls 88 are urged about their respective bearing bolts by springs 92, to enter their respective tunnels 56 and grip the wires 2 contained therein by pressing them against the side walls of the tunnels, formed by the upturned or downturned side edges of the plates 66 opposite the pawls. For holding the non-selected pawls 88 in inoperative positions in order to prevent them gripping their associated wires 2 there is provided selector mechanism comprising an arrangement of rotary cams 94 having varying configurations for a purpose hereinafter explained. Each pawl 88 has a cam 94 associated therewith, the cams 94 also being contained in the openings 90. The cams associated with the pawls 88 which operate in the tunnels extending along the forward side of the block 54 are secured in spaced apart relationship on a spindle 96 and the cams associated with the pawls 88 which operate in the tunnels extending along the rearward side of the block 54 are secured on a spindle 98. The spindles 96 and 98, which extend heightwise through the block 54, are mounted for rotation in the block thereby to rotate their respective cams 94. Each pawl 88 has a tail portion 100 which, when engaged by an arcuate edge surface 102 of its associated cam 94 holds the pawl in its inoperative position. Each cam 94 is provided with a number of notches 104 so ararnged that when a cam 94 is in a position in which the tail portion 100 of the associated pawl 88 may enter one of the notches 104, the associated spring 92 may urge that pawl into operative position in which it grips a wire 2. It will be seen from FIGS. 13–23 that the notches 104 are variously disposed around the peripheries of the cams 94, the cams being designed to enable a variety of combinations of wires to be gripped. The spindles 96 and 98 on which the cams are secured are respectively rotated by means of knobs 103 and 105 fixed to their lower ends beneath the base plate 62. Rotation of the knob 103 enables the operator to select the wires, to be gripped and fed, extending along the tunnels 56 at the forward side of the block 54, and the knob 105 enables the operator to select the wires, to be gripped and fed, extending along the tunnels 56 at the rearward side of the block 54, i.e., these wires to provide slugs for inserting in the back curve region of a top lift. The notches 104 in the cams 94 on the spindle 96 are so shaped as to enable the tail portions 100 of the pawls 88 to ride out of the notches when said cams are rotated in a clockwise direction (as seen in FIGS. 13–23), the notches 104 in the cams 94 on the spindle 98 being so shaped as to enable the tail portions of their associated pawls 88 to ride out of the notches when said cams are rotated in a counterclockwise direction. FIGS. 13–23 show wires 2 gripped in the lowest and topmost of the forward tunnels 56 and in the bottom two and topmost two of the rearward tunnels 56. The shape and arrangement of the pawls 88 is such that when they grip wires to feed them in the direction of the arrows in FIGS. 10, 11 and 13–23 they tend to dig into the wires but on the return stroke of the block 54 the pawls present a curved leading edge to the wires and may yield against their springs 92 so that they may automatically release and ride over the wires.

Mounted for rotation on the other pair of bolts 63 are pawls 106, there being a pawl 106 associated with each tunnel 56. The pawls 106 are contained in openings 108 in the plates 64, 68, 70, 72, 76, 80, 82, 84 and 86 and are urged by springs 110 into gripping engagement with the wires 2 in their respective tunnels. The pawls 106 are held in inoperative positions out of engagement with the wires in a similar manner to the pawls 88 by rotary cams 112 secured on the spindles 96 and 98. However, each cam 112 has only one notch 114 similar to the notches 104, the notches 114 being disposed in the peripheral edges of the cams 112 so that the notches in the cams 112 secured on each spindle are in alignment. Thus, the spindles 96 and 98 may be rotated into positions in which all the wires are gripped at the same time by the pawls 106 through tail portions of the pawls 106 engaging in the notches 114. While being similar in shape to the pawls 88, the pawls 106 are in reversed positions to those pawls so that they grip the wires to feed them in the opposite direction to the direction of feed of the wires during an operative cycle of the machine. The purpose of this arrangement is such that, should the operator desire to change the wire guiding device 38 for another, the pawls 106 may be set to grip all the wires 2 and by releasing the block 54 from its operating means, hereinafter described, the block 54 may be slid along the bracket 46, in the direction to withdraw the portions of the wires extending through the device 38 and stationary shearing die 4 into the fixed guide block 52. All the cams 94 have notches 104 positioned to allow all the pawls 88 to grip their respective wires when the pawls 106 grip the wires so that movement of the block 54 towards the block 52, after changing the guiding device and in order to re-engage the block 54 with its operating means, moves the wires gripped by the pawls 88 through the tubes in the wire guiding device positioned in the machine to take up position in the die 4 ready for feeding when the machine is tripped.

The block 54 is connected to a slide 116 (FIGS. 4 and 5) slidably mounted in a slideway parallel to and opening into the slideway 60 in the bracket 46, by means of a spring plunger 118 extending heightwise in the block 54 and having its upper end projecting into a bore in the slide 116 (see also FIG. 10). To change the wire guiding device 38 as above described, the operator must first withdraw the wires 2 from the device. To this end the operator sets the control knobs 103, 105 and 134, 136 in their proper settings so all wires are gripped in the block 54 and released from the block 52. The operator then disengages the block 54 from its operating slide 116 by pulling the spring plunger 118 out of the bore in the slide and moves the block to the left, as seen in FIG. 4, until the wires are fully retracted from the device 38. This movement of the block 54 is limited by engagement of an upwardly projecting portion 210 (FIGS. 4 and 10) of one of the bolts 63 with the end of a slot 212 in the slide 116. After the device 38 is replaced the block 54 is returned to its initial position where the plunger 118 can be again engaged with the bore in the slide 116. The slide 116 is provided with rack teeth 120 on an upper surface thereof arranged to mesh with teeth on a gear segment 122 (FIG. 4). The gear segment 122 is pivotally mounted on a pin 123 mounted in the bracket 46, an arm 124 integral with the gear segment 122 being pivotally connected to one end of a link 126. The other end of the link 126 is connected to an arm 128 (shown broken away in FIGS. 4 and 5). Counterclockwise movement of the arm 128 (as seen in FIG. 4) swings the gear segment 122 about the pin 123 to move the slide 116 in a direction to carry the block 54 connected thereto in a direction towards the fixed block 52. Wires 2 gripped in the block 54 by the pawls 88 are thus fed into the shearing and transferring device 6 for slugs to be sheared from said wires. The length of wires fed into said device will depend on the length of stroke of the block 54 and this may be varied in order to provide slugs of a convenient length for the work being operated on. To alter the length of stroke of the block 54 the link 126 may be adjusted along a slot 130 in the arm 128 thereby to determine the effective length of the arm 128 from a pivot and thus the amount of movement imparted by the arm to the gear segment 122 and slide 116.

During an operative cycle of the machine the arm 128 oscillates about its pivot to first feed wires gripped in the block 54 and then to return the block 54 to its original position in the slideway 60. One of the purposes of the fixed block 52 is to prevent any tendency of the wires 2 not gripped in the block 54 to move along their respective tunnels 56 during a feeding movement of the block 54. As hereinbefore mentioned, the block 52 comprises an assembly similar to the block 54 and has a series of plates so arranged as to provide wire guide tunnels (not shown) aligned in the machine with the wire guide tunnels 56 in the block 54. Each tunnel in the block 52 has a pawl associated therewith spring urged into gripping engagement with the wire 2 extending through the tunnel, each pawl being reversed in position relatively to the pawl 88 in the corresponding tunnel 56 in the reciprocable block 54 so as to oppose feeding movement of the wire through the fixed block. These pawls are disengaed from the wires by means of cams operated in a similar manner to the cams for controlling the pawls 88, the cams for operating the pawls in the block 52 being spaced along a pair of spindles extending heightwise through the block 52 and having, respectively, control knobs 134 and 136 secured to their lower ends. The construction is such that an operator may select the wires 2 to be fed by setting the knobs 103 and 105, the knobs 134 and 136 also being settable so that only the wires 2, not required to be fed, are engaged by pawls. Also associated with each tunnel in the fixed block 52 is another pawl (not shown) normally spring urged to engage the wire 2 in its associated tunnel automatically to prevent return movement of said wire on the return stroke of the block 54. During an operative cycle of the machine all nine wires are engaged by these pawls which face in the same directions as the pawls 88, as to yield against their springs when wires are fed thereby but gripping the wires against any tendency of return movement thereof during the return stroke of the reciprocable block 54. The pawls in the block 52 have cams associated therewith arranged so that all the pawls may be disengaged simultaneously in order that the wires 2 may be withdrawn into the fixed block 52 as hereinbefore described for replacing a wire guiding device 38. For ease in setting the control knobs 103, 105, 134 and 136 to the appropriate symbols, the symbols are marked on upper faces 214 (FIG. 10) of the knobs around the peripheral margins thereof. The knobs are rotatably mounted in recesses in plates 216, there being a plate 216 included in each guide block assembly immediately above its associated control knobs. Each plate 216 projects outwardly from the sides of its associated assembly, as best seen in FIG. 11, and is provided with windows 218 through which are visible the symbols on the knob faces 214. Clearance cuts 219 (FIGS. 1 and 4) in the bracket 46 enable the machine operator to view the windows 218.

The slug shearing and transferring device 6 operates in a known manner in that the passages in the stationary shearing die 4 register with the throats 5 during the wire feeding part of the machine cycle followed by rotary movement of the device 6 through 90° to cut off the lengths of the wires fed into the device and transfer them into vertical positions in which they may be driven into work placed in the machine. In the illustrative machine the device 6 has twenty seven wire receiving throats 5 capable of registering with the twenty seven wire receiving passages in the stationary shearing die 4.

In the illustrative machine the sequence of an operative cycle is such that, when slugs sheared from the wires 2 are transferred into their vertical positions, driver mechanism including a driver bar 140 (FIG. 24) descends, in known manner, to urge drivers 142 through the throats 5 to drive the slugs contained therein simultaneously into the work placed in the machine for operation thereon. The driver bar 140 does not carry the drivers 142 as in previous machines, the drivers being separately contained in the slug shearing and transferring device 6 in a manner now to be explained.

The slug shearing and transferring device 6 comprises an assembly secured on the forward end of a rotatable shaft 144 (FIGS. 4, 24 and 25). This assembly includes a block, having the throats 5 and a shear face 50, secured to a carrier 146 which in turn is secured to the shaft 144. A forwardly projecting portion 148 of the carrier 146 is provided with twenty seven passages which register with and provide continuations of the throats 5. Forwardly extending projections 150 on the carrier 146 are spaced apart from the projecting portion 148, a plate 152 being supported in the carrier 146 for sliding movement between the projections 150 and portion 148. The plate 152 is supported for sliding movement on a pair of posts 154, extending between the projections 150 and portion 148, compression springs 156 surrounding the posts normally urging the plate 152 against the projections 150. The drivers 142 are carried by the plate 152 and extend therefrom into the passages in the portion 148 of the carrier 146 thus being supported in alignment for movement through the throats 5 to drive slugs contained therein. At an appropriate time in the machine cycle the driver bar 140 descends and strikes a face 158 on the plate 152 and between the projections 150 to move the plate downwardly and thereby move the drivers 142 through the throats 5. On the return stroke of the driver bar the springs 156 retract the drivers 142 by urging the plate 152 into engagement with the projections 150. It will be seen therefore that the drivers 142 are maintained in accurate alignment with the throats 5 even should the driver bar 140 become slightly displaced through wear in its connections. Furthermore, if desirable, the shear block and drivers may be removed as a unit and replaced with another, having a different throat and driver formation, without having to interfere with the driver bar.

The machine is also provided with means for clamping together a top lift and heel for the fasteners to be inserted therein. For this purpose a vertically slidable post 160 (FIGS. 1, 28 and 29) is adapted to receive on its upper end a sleeve carrying either a support for loose heels or a support for shoes with heels attached thereto. The post 160 is mounted for sliding movement in a bearing housing 162 of the machine frame 164. Rack teeth 166 formed along a portion of the post 160 engage with teeth on a gear 168 fixed on a spindle 170 mounted for rotation about a horizontal axis in the housing 162. A torsion spring 172, by tending to unwind raises the post 160 until an adjustable stop member 173 threaded on the lower end of the post engages the underside of the housing 162. The torsion spring 172 is coiled about the spindle 170 at one side of the gear 168 and has one of its ends anchored in the gear and its other end anchored in a rotatable bearing member 174 mounted for rotation in the housing 162 and about the spindle 170. The spring 172 is prevented from unwinding by the member 174 engaging a stop pin 176 (FIG. 31) in the housing 162.

When the extra load of work and support therefor is placed on the post 160 the post is caused to descend and in order to support the work at a convenient height when placed in the machine there is provided a second torsion spring 178 which may be adjusted to support varying loads and heights of heels to be operated on. This spring 178 encircles the spindle 170 on the opposite side of the gear 168 and by tending to unwind also raises the post 160. One end of the spring 178 is anchored in the gear 168 while the other end is anchored in an operator rotatable bearing member 180 in the housing 162. The spring 178 is prevented from unwinding by a spring poppet 182 in the housing 162 engaging in one of an arcuate series of notches 184 in the member 180. By rotation of the member 180 the machine operator may either wind up or unwind the spring 178 to vary the force of the spring 178 tending to rotate the gear 168 and raise the post 160. Thus, the height at which work placed in the machine is supported may conveniently be adjusted along with adjustment of the force required for varying weights of the work. The construction is such that the post 160 and work support may be easily depressed by the operator to place work in position thereon, depression of the post 160 rotating the gear 168, together with its spindle 170, to wind up the springs 178 and 172 which again move the post heightwise when it is released.

The machine is also provided with a work plate 182 (FIG. 4) against which work positioned in the machine may be urged by the post 160. As hereinafter described, the post may be automatically locked against yielding prior to the driving of slugs into the work. For positioning a top lift and heel to be operated on relatively to each other in the machine and relatively to the driver mechanism thereof in order for slugs to be correctly positioned in the work there is provided locating means situated immediately under the plate 182. A composite bracket 184 (see also FIGS. 26 and 27) provides a pair of parallel guideways, one above the other, extending forwardly and rearwardly in the machine for supporting a gage arrangement. Mounted in each guideway is a gage, the topmost gage 186 having an upturned lip 188 at its forward end for engaging the back curve edge of a toplift placed in the machine and the lowermost gage 190 having an upturned lip 192 at its forward end for engaging the back curve edge, adjacent the top lift, of a heel placed in the machine. Each of said gages may be independently adjusted forwardly and rearwardly in the machine according to the size of top lift and heel to be operated on, suitable indication marks being provided on edges of the gages for the operator easily to position them by aligning the appropriate mark with a back edge of the bracket 184. The gages 186 and 190 are clamped in position by means of a stud 194 extending through the bracket 184 and slots 196 in the gages, the stud 194 having on its lower end a thumb nut 197 which may be tightened when the gages have been set. The slots 196 in the gages provide clearance for fore and aft adjustment thereof.

For positioning a top lift laterally of the machine there is provided a pair of fingers 198 pivotally mounted on studs 200 which extend heightwise through the bracket 184 and secure it in the machine. The fingers 198 are provided with intermeshing gear teeth 202 so that the fingers move in opposite directions about their pivots by equal amounts. The fingers are urged towards each other by a leaf spring 204 to positions determined by engagement of cam faces 206 on the fingers with the lip 188 on the gage 186. The cam faces 206 are so arranged that forward or rearward adjustment of the gage 186 automatically adjusts the fingers 198 a convenient distance apart to receive the top lift for which the gage 186 is set. The construction is such that with the gage 186 correctly positioned, the fingers 198 are sprung apart by insertion of a top lift just sufficient for the top lift to be gripped between the fingers. A similar pair of fingers 208 are provided for locating a heel laterally of the machine, the fingers 208 being adjusted automatically by adjustment of the gage 190 in a similar manner to that just described for the fingers 198.

For clamping the work together and firmly against the work plate 182 before the machine cycle commences, the operator depresses a single treadle 220 (FIG. 30) which acts first to clamp the top lift and heel together and then acts to trip the machine to initiate the machine operation. The treadle 220 is pivotally mounted on a shaft 222 in the machine. A forward portion of the treadle is connected by a composite link 224 to one end of an arcuate member 226 (FIGS. 1, 29 and 31) pivoted at its other end on a pin 228 in the bearing member 174. The member 226 occupies a slot in the bearing member 174 and has a tooth 230, substantially V-shaped in cross section, projecting inwardly to engage in a correspondingly shaped groove 232 extending around a peripheral edge of the spindle 170. Initial depression of the treadle, through the link 224, urges the tooth 230 into the groove 232 by moving the arcuate member 226 about its pivot pin 228, at the same time pulling on the arcuate member to rotate the bearing member 174 in a counterclockwise direction (as seen in FIG. 31) in the housing 162. Through the frictional engagement between the tooth 230 and the groove 232 the spindle 170 is also rotated with the bearing member 174. Rotation of the spindle 170 and the aforementioned gear 168 secured thereto clamps the work in the machine firmly against the underside of the work plate 182 for receiving slugs to be driven into the work. The stop member 173 is of course adjusted on the post 160 to a position in which it does not prevent the work being clamped against the plate 182. Since some slender heels could be damaged if the clamping pressure were too great the pressure may be adjusted by means of a spring yield device incorporated in the link 224. This device includes a compression spring 234 encased in a tube 236 having a screw end cap 238 for adjusting the tension of the spring 234.

Further depression of the treadle after the work is clamped against the plate 182 causes the link 224 to yield and through a treadle arm 248 and push rod 250 also causes a latch 240 to be released from a cam lever 247. The push rod acts against an abutment 252 pivoted on one end of the latch which in turn is pivoted on a pin 242 carried by an arm 244. The arm 244 is fixed on a shaft 246 which also forms a pivot for the cam lever 247. On release of the latch 240 the arm 244 is urged by a spring (not shown) in a clockwise direction (as seen in FIG. 30) to rotate the shaft 246. The shaft 246 has another arm (not shown) secured thereto which upon rotation of the shaft operates to engage the machine clutch and initiate an operative cycle of the machine. A link 255 connected to the arm 244 simultaneously causes a brake mechanism to be released to permit the various instrumentalities of the illustrative machine to be operated in sequence by cams on a shaft in a known manner.

Initiation of the operative cycle of the machine first causes the block 54 to move towards the block 52 to feed the selected wires 2 into the device 6. The device 6 then rotates through 90° in a counterclockwise direction (as seen from the front of the machine) to shear slugs from the ends of the wires and transfer them into a position above the work in the machine. The driver bar 140 then descends to operate the drivers 142 which move through the throat 5 in the device 6 to drive the slugs contained therein through registering passages in the work plate 182 and into the work.

Prior to descent of the driver bar 140 the post 160 supporting the work is locked against movement which might be caused by impact of the slugs driven into the work by means now to be described. Pivotally mounted on a pin 254 in the housing 162 is a wedge 256 (FIGS. 28 and 29). A link, in the form of a spring 258, connects one end of the wedge to one arm of a bell crank lever 260 pivotally mounted on a pin 262 in the machine frame 164. The bell crank lever 260 is rocked about its pivot in a counterclockwise direction (as seen in FIG. 28) by connections (not shown) between the other arm of the bell crank lever and a cam on the aforementioned cam shaft so that the wedge 256 firmly grips the post 160. The construction and arrangement of the machine is such that the wedge 256 is caused to release the post 160 immediately after the slugs have been driven.

The cam lever 247 (FIG. 30) extends upwardly and has at its upper end a cam roll 264 which engages in a face cam (not shown) on the aforementioned cam shaft. The construction is such that towards the completion of an operative cycle of the machine the cam lever 247 is swung by its associated cam in a clockwise direction (as seen in FIG. 30) to a position in which it may once again engage the latch 240 which is urged upwardly into latching engagement by a spring 265. The cam lever 247 is then swung by its cams in the opposite direction about the shaft 246 to its initial position shown in FIG. 30. Through the latch 240 and cam lever 247, the arm 244 is also moved therewith thus causing the clutch to be disengaged and the brake to be applied to terminate the machine cycle. When the machine comes to rest at the end of an operative cycle the block 54 has returned to its initial position, as seen in FIG. 4, ready for the next wire feeding movement and the slug shearing and transferring device 6 has returned to its wire receiving position.

After initiating an operative cycle of the machine the operator normally releases the treadle 220 but should he have failed to do this the machine will still come to rest at the end of the cycle in the following manner. The aforementioned abutment 252 (FIG. 30) on the latch 240 normally assumes a position in which it is held against a face on the latch by a leaf spring 268. Should the push rod 250 still be elevated, by the treadle being held depressed, when the other parts shown in FIG. 30, return to their rest positions the push rod 250 will engage a side edge of the abutment 252 which yields about its pivot as the associated parts assume their rest positions. Thus, when the treadle is released, the push rod will descend and the spring 268 may urge the abutment into its normal position for engagement by the push rod when next the machine is tripped.

Although the illustrative machine is adapted for the attachment of top lifts to shoe heels it is obvious that the various features utilized are adaptable for performing a wide variety of operations necessitating the insertion of fasteners in workpieces.

Having thus described my invention, what I claim as new and desire to secure by Letters Patent of the United States is:

1. In apparatus for dispensing patterns of fasteners formed from a plurality of wires, a wire severing and dispensing mechanism adapted to receive said wires for forming and dispensing fasteners in a variety of possible patterns, feeding means including a plurality of pawls each engageable to grip an individual wire for feeding movement toward said mechanism, operator settable means for engaging selected pawls with associated wires while disengaging non-selected pawls, and means for moving said feeding means toward and away from said mechanism for feeding a selected number and pattern of wires to said mechanism.

2. In apparatus for dispensing patterns of fasteners formed from a plurality of wires, a wire severing and dispensing mechanism adapted to receive said wires for forming and dispensing fasteners in a variety of possible patterns, feeding means including a reciprocable block having a plurality of guideways each adapted to receive an individual wire, a plurality of pawls carried by said block and each engageable to grip an individual wire in its guideway for movement with said block, operator settable means for engaging selected pawls with associated wires while disengaging non-selected pawls, and means for reciprocating said block toward and away from said mechanism for feeding a selected number and pattern of wires to said mechanism.

3. In apparatus for dispensing patterns of fasteners formed from a plurality of wires, a wire severing and dispensing mechanism adapted to receive said wires for forming and dispensing fasteners in a variety of possible patterns, feeding means including a reciprocable block having a plurality of guideways each adapted to receive an individual wire, a first set of pawls carried by the reciprocable block and each engageable to grip an individual wire in its guideway for movement with said block, operator settable means for engaging selected ones of the first set of pawls with associated wires while disengaging non-selected pawls, means for reciprocating said block toward and away from said mechanism for feeding a selected number and pattern of wires to said mechanism, a fixed block having passages aligned with the guideways of the reciprocable block for guiding individual wires passing through the reciprocable block, a second set of pawls carried by the fixed block and each engageable to grip an individual wire in its passage against movement through the fixed block, and second operator settable means associated with the fixed block for engaging selected ones of the second set of pawls with associated wires which have not been selected for feeding by the reciprocable block.

4. In apparatus for dispensing patterns of fasteners formed from a plurality of wires, a wire severing and dispensing mechanism adapted to receive said wires for forming and dispensing fasteners in a variety of possible patterns, feeding means including a plurality of pawls each engageable to grip an individual wire for feeding movement toward said mechanism, operator settable means for engaging selected pawls with associated wires while disengaging non-selected pawls, means for moving said feeding means toward and away from said mechanism for feeding a selected number of wires to said mechanism, and an interchangeable pattern selecting device for guiding the selected wires from said feeding means to said mechanism in a predetermined pattern.

5. In apparatus for dispensing patterns of fasteners formed from a plurality of wires, a wire severing and dispensing mechanism adapted to receive said wires for forming and dispensing fasteners in a variety of possible patterns, feeding means including a plurality of pawls each engageable to grip an individual wire for feeding movement toward said mechanism, operator settable means for engaging selected pawls with associated wires while disengaging non-selected pawls, and means for moving said feeding means toward and away from said mechanism for feeding a selected number and pattern of wires to said mechanism, an interchangeable pattern selecting device for guiding the selected wires from said feeding means to said mechanism in a predetermined pattern, and means for releasing said feeding means from said moving means for retraction beyond its initial position to retract said wires from said device to permit its interchange.

6. In apparatus for dispensing patterns of fasteners formed from a plurality of wires, a wire severing and dispensing mechanism adapted to receive said wires for forming and dispensing fasteners in a variety of possible patterns, wire feeding means including a reciprocable block having a plurality of guideways each adapted to receive an individual wire, a plurality of pawls carried by said block and each engageable to grip an individual wire in its guideway for movement with said block, operator settable means for engaging selected pawls with associated wires while disengaging non-selected pawls, and means for reciprocating said block toward and away from said mechanism for feeding a selected number and pattern of wires to said mechanism, and an interchangeable pattern selecting device for guiding the selected wires from said feeding block to said mechanism in a predetermined pattern.

7. In apparatus for dispensing patterns of fasteners formed from a plurality of wires, a wire severing and dispensing mechanism adapted to receive said wires for forming and dispensing fasteners in a variety of possible patterns, wire feeding means including a reciprocable block having a plurality of guideways each adapted to receive an individual wire, a plurality of pawls carried by said block and each engageable to grip an individual wire in its guideway for movement with said block, operator settable means for engaging selected pawls with associated wires while disengaging non-selected pawls, and means for reciprocating said block toward and away from said mechanism for feeding a selected number of wires to said mechanism, an interchangeable pattern selecting device for guiding the selected wires from said feeding block to said mechanism in a predetermined pattern, and means for releasing said block from the moving means for retraction beyond its initial position to retract said wires from said device to permit its interchange.

8. In apparatus for dispensing patterns of fasteners formed from a plurality of wires, a wire severing and dispensing mechanism adapted to receive said wires for forming and dispensing fasteners in a variety of possible patterns, feeding means including a first set of pawls each engageable to grip an individual wire for feeding movement toward said mechanism, a second set of pawls each engageable to grip an individual wire for retracting movement away from said mechanism, operator settable means for engaging selected pawls of said first set with associated wires while disengaging non-selected pawls of said first set, said operator settable means also being adapted to engage all pawls of said first set and said second set, means for moving said feeding means toward and away from said mechanism for causing said first set of pawls to feed a selected number of wires to said mechanism, an interchangeable pattern selecting device for guiding wires from said feeding means to said mechanism in a predetermined pattern, and means for releasing said feeding means from said moving means for retraction beyond its initial position to cause said second set of pawls to withdraw said wires from said device to permit its interchange, said first set of pawls being effective upon return of said feeding means to its initial position to return said wires to their initial positions within said device after its interchange.

9. In apparatus for forming and driving selected patterns of fasteners formed from a plurality of wires, a wire severing and driving mechanism comprising a stationary die having wire guiding passages, a movable die having bores arranged in a pattern corresponding to the pattern of said passages, a plurality of drivers slidably received in said bores and having a common head, and a carrier mounting the movable die and the drivers for unitary bodily movement with respect to the stationary die, said carrier being movable from a wire receiving position in which said bores are aligned with said passages to a driving position in which the bores and drivers are aligned with a work piece into which fasteners are to be driven, means for feeding a selected number and pattern of wires through said passages and into said bores when the carrier is in its receiving position, said feeding means including a plurality of pawls each engageable to grip an individual wire for feeding movement toward said mechanism, operator settable means for engaging selected pawls with associated wires while disengaging non-selected pawls, and means for moving said feeding means toward said mechanism for feeding a selected number and pattern of wires through said passages and into said bores, means operative after said wires are fed for moving said carrier from its wire receiving position to its driving position thereby cutting said wires to form fasteners which are transferred to driving position, and a driver bar acting against said common head when the carrier is in its driving position for moving the drivers in the bores to drive a selected number and pattern of fasteners into said work piece.

10. In a fastener forming and driving device, a stationary die having wire guiding passages, a movable die having bores arranged in a pattern corresponding to the pattern of said guiding passages, a plurality of drivers slidably received in the bores and having a common head, a carrier mounting the movable die and the drivers for unitary bodily movement with respect to the stationary die, said carrier being movable between a wire receiving position in which said bores are aligned with said passages and a driving position in which the bores and drivers are aligned with a work piece into which fasteners are to be driven, means for feeding a plurality of wires through said passages and into said bores when the carrier is in said receiving position, means operative after said wires are fed for moving said carrier from said receiving position to said driving position thereby cutting said wires to form fasteners which are contained in said bores and transferred to driving position, and a driver bar acting against said common head when the carrier is in said driving position for moving the drivers in the bores to drive the fasteners into said work piece.

11. In a fastener forming and driving device, a stationary die having wire guiding passages, a movable die having bores arranged in a pattern corresponding to the pattern of said guiding passages, a plurality of drivers slidably received in the said bores and having a common head, spring means normally retracting said drivers toward one end of the bores thereby forming wire receiving passages, a carrier mounting the movable die and the drivers for unitary bodily movement with respect to the stationary die, said carrier being movable between a wire receiving position in which said bores are aligned with said passages and a driving position in which the bores and drivers are aligned with a work piece into which fasteners are to be driven, means for feeding a plurality of wires through said passages and into said bores when the carrier is in said receiving position, means operative after said wires are fed for moving said carrier from said receiving position to said driving position thereby cutting said wires to form fasteners which are contained in said bores and transferred to driving position, and a driver bar acting on said common head when the carrier is in said driving position for moving the drivers in the bores to drive the fasteners into said work piece.

12. In a fastener forming and driving device, a stationary die having an arcuate cutting surface and a plurality of wire guiding passages leading thereto, a movable die having a cutting surface complementary to said arcuate surface and having a plurality of bores leading therefrom, drivers slidably received in said bores and having a common head, a carrier mounting the movable die and the drivers for bodily movement from a wire receiving position in which the bores are aligned with the passages to a driving position in which the bores and drivers are aligned with a work piece into which fasteners are to be driven, means for feeding a plurality of wires through said passages and into said bores when the carrier is in said receiving position, means operative after said wires are fed for moving the carrier to its driving position thereby cutting said wires to form fasteners which are transferred into driving position, and means acting against said common head when the carrier is in its driving position to drive the fasteners into said work piece.

13. In a machine for forming and driving fasteners in a work piece, a fixed die, a movable die cooperating therewith and having bores arranged in a pattern corresponding to a pattern of guiding passages in the fixed die, a plurality of drivers received in said bores and having a common head, a carrier mounting the movable die and the drivers for unitary bodily movement with respect to the fixed die, said carrier being movable between a wire receiving position in which said bores are aligned with said passages and a driving position in which bores and drivers are aligned with openings in a work positioning abutment, means for feeding a selected number and pattern of wires to said passages and into the bores when the carrier is in its receiving position, means operative after said wires are fed for moving said carrier to its driving position thereby cutting the wires in the bores to form fasteners which are transferred to driving position, a driver bar movable against said common head when the carrier is in its driving position for moving the drivers in the bores to drive fasteners through the openings in said abutment, a work supporting post, a spring acting to move the post for carrying work pieces into light engagement with said abutment, a treadle, means operable upon actuation of the treadle for yieldingly connecting the treadle to said post to impart an additional predetermined force to clamp the work piece against the abutment, said treadle thereafter being effective to initiate operation of the machine whereby the work piece first is fixed against movement and then a predetermined number and pattern of fasteners is formed and driven into the work piece.

14. In a work supporting apparatus, a work supporting post having rack teeth thereon, a gear engaging said teeth, a shaft on which said gear is fixed, a spring acting to move the post for carrying work pieces into light positioning engagement with an abutment, a member engageable with the shaft for unitary rotation therewith, said member being normally disengaged from the shaft to permit relative movement between the shaft and member, a treadle, and means yieldably connecting the treadle to said member whereby actuation of the treadle first engages the member with the shaft and thereafter imparts a yieldable rotational force to the shaft for causing the post to exert an additional predetermined clamping force to the work piece.

15. In a work supporting apparatus, a work supporting post having rack teeth thereon, a gear engaging said teeth, a shaft on which said gear is fixed, a spring acting to move the post toward a work positioning abutment, means for adjusting the effective force of the spring so the post is moved by a force sufficient to carry work pieces of different weights into light engagement with the abutment, a member engageable with the shaft for unitary rotation therewith, said member being normally disengaged from the shaft to permit relative movement between the shaft and member, a treadle, and means yieldably connecting the treadle to said member whereby actuation of the treadle first engages the member with the shaft and thereafter imparts a yieldable rotational force to the shaft for causing the post to exert an additional predetermined clamping force to the work piece.

16. In a work supporting apparatus, a work supporting post having rack teeth thereon, a gear engaging said teeth, a shaft on which said gear is fixed, a torsion spring acting to rotate the gear in a direction which moves the post toward a work positioning abutment, means for adjusting the torsion of the spring so the post is moved by a force sufficient to carry work pieces of different weights into light engagement with said abutment, a member engageable with the shaft for unitary rotation therewith, said member being normally disengaged from the shaft to permit relative movement between the shaft and member, a treadle, and means yieldably connecting the treadle to said member whereby actuation of the treadle first engages the member with the shaft and thereafter imparts a yieldable rotational force to the shaft for causing the post to exert an additional predetermined clamping force to the work piece.

17. In a work supporting apparatus, a work supporting post having rack teeth thereon, a gear engaging said teeth, a shaft on which said gear is fixed, a torsion spring acting to rotate the gear in a direction which moves the post toward a work positioning abutment, means for adjusting the torsion of the spring so the post is moved by a force sufficient to carry work pieces of different weights into light engagement with said abutment, a member engageable with the shaft for unitary rotation therewith, said member being normally disengaged from the shaft to permit relative movement between the shaft and member, a treadle, means yieldably connecting the treadle to said member whereby actuation of the treadle first engages the member with the shaft and thereafter imparts a yieldable rotational force to the shaft for causing the post to exert an additional predetermined clamping force to the work piece, and means for adjusting the yielding action of the connecting means for varying the clamping force applied by actuation of the treadle.

18. In a work supporting apparatus, a work supporting post having rack teeth thereon, a gear engaging said teeth, a shaft on which said gear is fixed, said shaft having an annular groove, a torsion spring acting to rotate the gear in a direction which moves the post toward a work positioning abutment, means for adjusting the torsion of the spring so the post is moved by a force sufficient to support work pieces of different weights and to carry them into light engagement with said abutment, a member mounted for rotation about the shaft, a link pivoted at one end to said member and having a lug engageable with said annular groove for connecting the shaft and member for unitary movement, said link being normally biased away from said shaft so the shaft and member are normally free for relative rotation, a treadle, and means yieldably connecting the treadle to said link whereby actuation of the treadle first engages the link with the groove and thereafter imparts a yieldable rotational force through the member to the shaft for causing the post to exert an additional predetermined clamping force to the work piece.

19. In work supporting apparatus, a work supporting post having rack teeth thereon, a gear engaging said teeth, a shaft on which said gear is fixed, said shaft having an annular groove, a torsion spring acting to rotate the gear in a direction which moves the post toward a work positioning abutment, means for adjusting the torsion of the spring so the post is moved by a force sufficient to support work pieces of different weights and to carry them into light engagement with said abutment, a member mounted for rotation about the shaft, a link pivoted at one end to said member and having a lug engageable with said annular groove for frictionally connecting the shaft and member for unitary movement, said link being normally biased away from said shaft so the shaft and member are normally free for relative rotation, a treadle, means yieldably connecting the treadle to said link whereby actuation of the treadle first engages the link with the groove and thereafter imparts a yieldable rotational force through the member to the shaft for causing the post to exert an additional predetermined clamping force to the work piece, and means for adjusting the yielding action of the connecting means for varying the effective clamping force applied by actuation of the treadle.

No references cited.